(12) United States Patent
Griffiths et al.

(10) Patent No.: US 11,566,923 B2
(45) Date of Patent: Jan. 31, 2023

(54) THERMAL PROTECTION SYSTEM AND METHOD INCLUDING A SEALED THERMAL BARRIER AND A THERMALLY-PROTECTED PRESSURE RELIEF VALVE

(71) Applicant: Datapaq Ltd., Norfolk (GB)

(72) Inventors: Stewart Griffiths, Bedford (GB); Marie Y. Murray, Newmarket (GB)

(73) Assignee: Datapaq Ltd., Norfolk (GB)

( * ) Notice: Subject to any disclaimer, the term of this patent is extended or adjusted under 35 U.S.C. 154(b) by 0 days.

(21) Appl. No.: 17/455,304

(22) Filed: Nov. 17, 2021

(65) Prior Publication Data

US 2022/0155108 A1    May 19, 2022

Related U.S. Application Data

(60) Provisional application No. 63/115,467, filed on Nov. 18, 2020.

(51) Int. Cl.
| | |
|---|---|
| *G01D 9/00* | (2006.01) |
| *G01D 11/24* | (2006.01) |
| *C21D 11/00* | (2006.01) |
| *F16L 59/02* | (2006.01) |

(52) U.S. Cl.
CPC ............ *G01D 11/24* (2013.01); *C21D 11/005* (2013.01); *F16L 59/02* (2013.01); *G01D 9/005* (2013.01)

(58) Field of Classification Search
CPC ...... G01D 11/24; G01D 9/005; C21D 11/005; F16L 59/02
See application file for complete search history.

(56) References Cited

U.S. PATENT DOCUMENTS

2021/0308509 A1* 10/2021 Hermanowski ......... F25D 23/06

FOREIGN PATENT DOCUMENTS

CN        215175655 U  * 12/2021

* cited by examiner

*Primary Examiner* — Jamel E Williams
(74) *Attorney, Agent, or Firm* — Seed Intellectual Property Law Group LLP

(57) ABSTRACT

A thermal protection system includes a housing, an interior cavity, and a thermal barrier within the housing. The thermal barrier includes a compartment containing an insulating medium, and is disposed around at least a part of the interior cavity to maintain a temperature of the interior cavity within a first temperature range. A pressure relief valve arranged at least partially within the housing is in fluid communication with the insulated compartment and permits a fluid, such as air, within the compartment to pass to the environment outside of the compartment when a fluid pressure within the compartment exceeds a predetermined pressure. The compartment is sealed from the environment except for the fluid communication via the pressure relief valve. The pressure relief valve is coupled to a thermally-protected mounting within the housing that maintains a temperature of an operative portion of the pressure relief valve within a second temperature range.

20 Claims, 4 Drawing Sheets

THERMAL PROTECTION SYSTEM AND METHOD INCLUDING A SEALED THERMAL BARRIER AND A THERMALLY-PROTECTED PRESSURE RELIEF VALVE

BACKGROUND

Technical Field

The present disclosure relates to a system and method for thermally protecting equipment that may include, for example, a data logging device configured to store data obtained during a treatment process, such as a heat treatment and water quench process.

Description of the Related Art

When manufacturing metal products, it is often desired to heat the metal products in a furnace to a high temperature such 1000° C., after which the metal products are quenched in a bath of water (or a water/polymer mix), and then possibly heated again in a further treatment process. Problems can occur when the metal products are situated in different areas of a product basket and suffer distortion due to uneven temperature distribution as the metal products pass through the heating and/or quenching processes. It is therefore desirable to monitor ambient temperatures and/or product temperatures throughout the heat treatment cycle and subsequent water quench. In this manner, the temperatures in the furnace and the rate of quench in different areas of the product basket can be monitored.

A method of monitoring the temperatures within a furnace includes coupling thermocouples to metal products within the product basket and connecting the thermocouples to a temperature data logging device. The temperature data logging device travels with the metal products through the furnace and is protected from the high temperatures of the furnace by a thermal barrier system. The thermal barrier system is designed to withstand high temperatures in the furnace for long durations.

Current thermal barrier systems use a disposable ceramic fiber insulation blanket that is wrapped externally around a box holding the temperature data logging device. The blanket and box are arranged within a cage. However, when a water quench is involved, the fiber blanket is compromised by the water and must be discarded when the heating and quenching processes are completed. Personal protective equipment (PPE) is required when fitting and removing the insulation blanket, and following use, the blanket must be disposed of in accordance with local restrictions, all of which can be costly and time consuming.

Current thermal barrier systems are also bulky in size. The present disclosure provides solutions to these problems and other problems that are present in the current thermal barrier systems.

DETAILED DESCRIPTION

As described herein, various embodiments of a thermal protection system provide thermal protection to equipment, such as a temperature data logging device, that is passed through a furnace and water quench to measure and record temperatures within the heating and quenching processes. As will be described herein, embodiments of the thermal protection system improve on existing thermal protection systems by providing a sealed (e.g., welded) thermal barrier that prevents an insulating medium within the thermal barrier from being compromised by water used in the water quench.

It is recognized that a thermal protection system with a fully-sealed thermal barrier presents a problem when air within the sealed thermal barrier expands due to elevated temperatures within the furnace. Over several heating cycles, such expansion may distort the housing of the thermal protection system to an extent where the seal is broken, and in the quenching process, water enters the thermal barrier and compromises the insulating medium within the thermal barrier. The problem encountered when improving the existing thermal barriers is that sealing the insulating medium in a compartment leads to an unacceptable build-up of pressure within the compartment and there are no pressure relief valves that work reliably at the elevated temperatures that are present within a furnace. A solution presented herein is to couple a pressure relief valve to a temperature-protected mounting. The pressure relief valve allows excess pressure that is built up within the insulating compartment to pass though the pressure relief valve to the outside environment while at the same time preventing water in a water quench from passing back into the insulating compartment. Because the pressure relief valve is coupled to a temperature-protected mounting, the pressure relief valve is not subjected to extreme high temperatures in the furnace and continues to function as the thermal protection system passes through the furnace. The resultant thermal protection system thus provides a thermal barrier that protects equipment used to monitor thermal processes that include a heating and quench phase over multiple heating and quenching cycles without having to replace the insulating medium in the thermal barrier.

Figure 1:
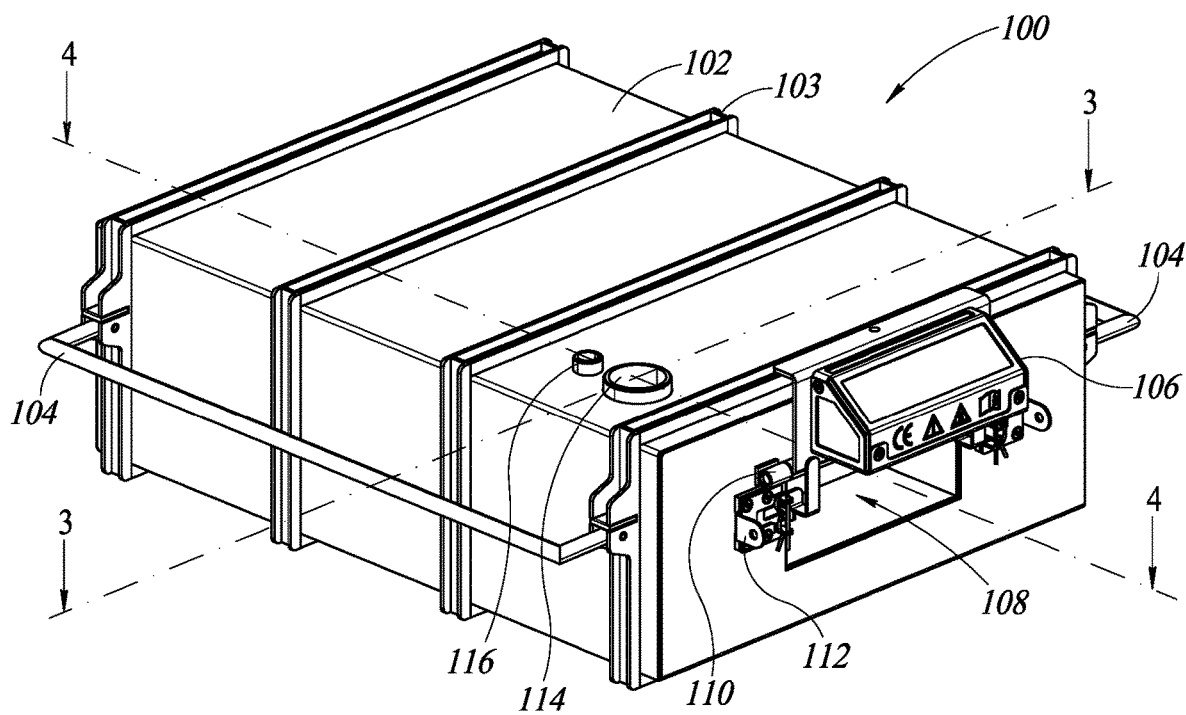
FIG. 1 illustrates a perspective view of at least one embodiment of a thermal protection system according to the present disclosure.

FIG. 1 illustrates a perspective view of at least one embodiment of a thermal protection system 100 according to the present disclosure. The thermal protection system 100 includes a housing 102. One or more anti-distortion support channels 103 may be disposed on or in a surface of the housing 102, e.g., as ribs extending across at least a part of the surface of the housing 102, to strengthen the housing against distortions from pressures arising within the housing. Within the housing is an interior cavity (see FIGS. 3 and 4) that can be used, for example, to hold electronic equipment, such as equipment used to measure and record external temperatures in a furnace and a water quench, and protect the equipment from high temperatures and water ingress in the heating and quenching processes.

The thermal protection system 100 may include one or more handles 104 that can be used to lift and set the system in desired locations. The thermal protection system 100 also includes a door 106 that, when opened, provides access to the interior cavity within the housing 102 via an opening 108. The door 106 may be rotatably mounted to hinges 110 that allow the door to rotate between opened and closed positions. FIG. 1 depicts the door 106 in the opened position. When the door 106 is in the closed position, a lockable latch 112 may be used to secure the door in the closed position. Also illustrated in FIG. 1 are openings to an access tube 114 and a filler tube 116 that will be described in greater detail below.

Figure 2:
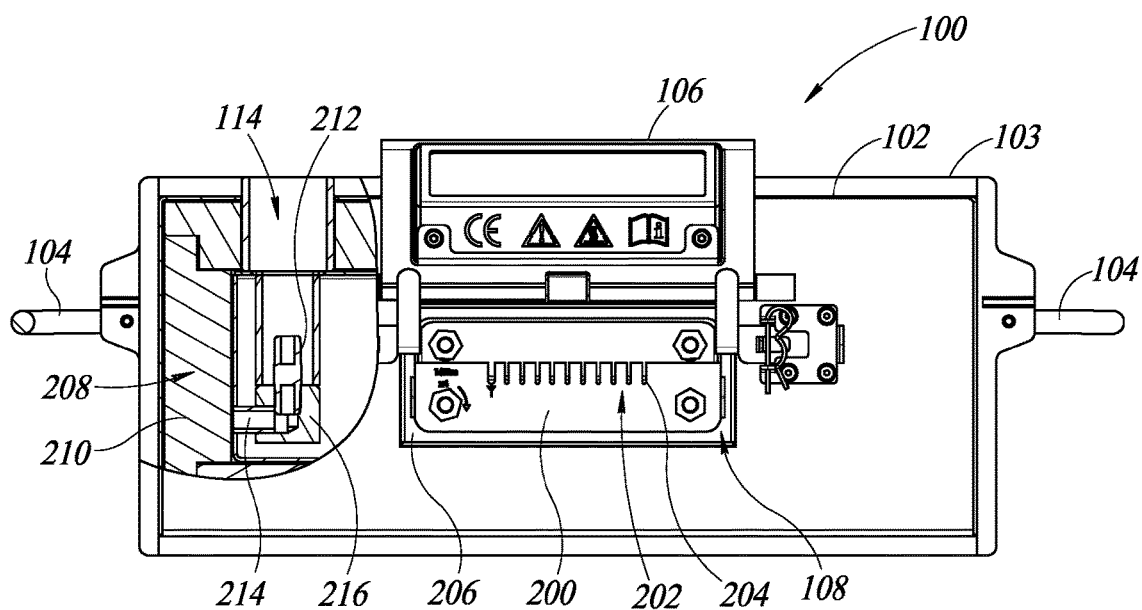
FIG. 2 illustrates a front view of the thermal protection system shown in FIG. 1.

FIG. 2 illustrates a front view of the thermal protection system 100 that is shown in FIG. 1. As with FIG. 1, the door 106 in FIG. 2 is shown in the open position. Within the opening 108 is a protection plate 200 that, when secured in place, seals the interior cavity within the housing 102 from the outside environment. When electronic equipment is placed within the interior cavity, it may be necessary to provide sealed passages for one or more wires to extend from the electronic equipment to the outside environment. Accordingly, the protection plate 200 includes a series of fingers 202 between which are slots 204. Wires connected to the electronic equipment within the interior cavity may be arranged in a sealed configuration (e.g., using silicon rubber seals) at the bottom of the slots 204. The door 106 is sized and configured such that the wires within the slots 204 may pass underneath the door 106 along a bottom edge 206 of the opening 108.

Figure 3:
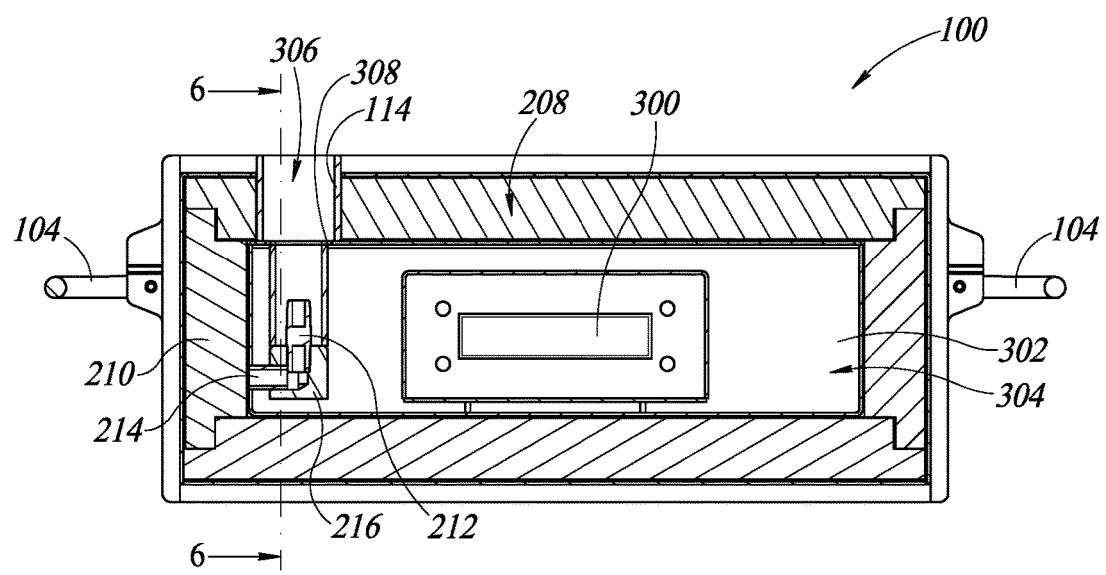
FIG. 3 illustrates a cross-section view of the thermal protection system along a line 3-3 shown in FIG. 1.
Figure 4:
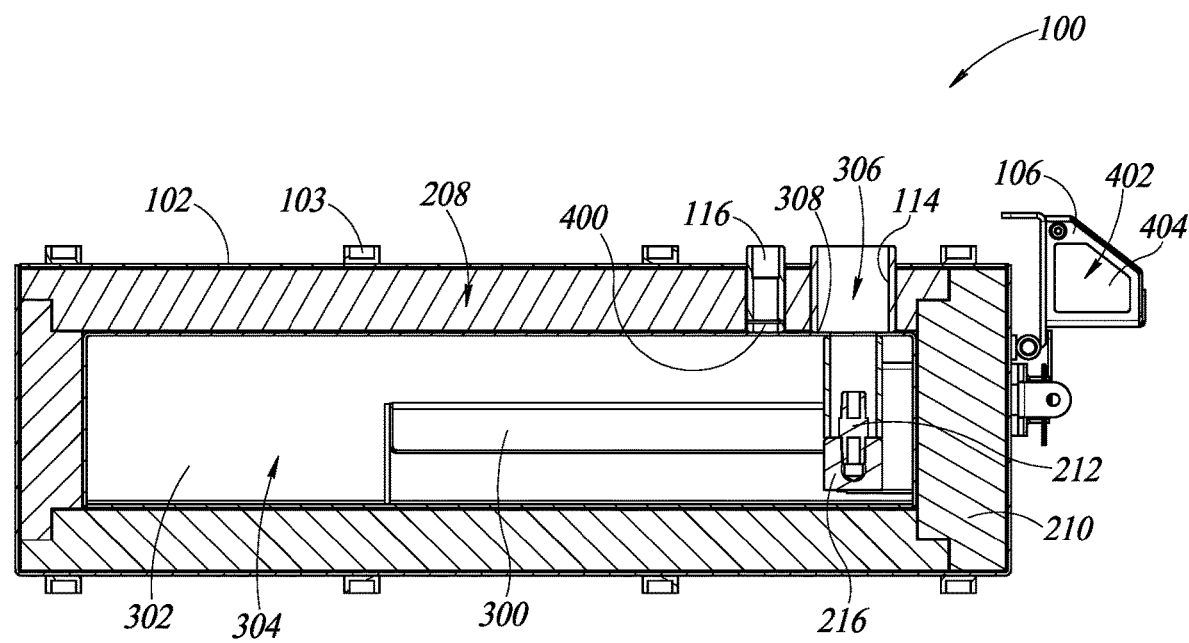
FIG. 4 illustrates a cross-section view of the thermal protection system along a line 4-4 shown in FIG. 1.

Further depicted on the left side of the view in FIG. 2 is a partial cutaway view showing a portion of the interior of the housing 102. As will be described in greater detail with regard to FIGS. 3 to 6, a thermal barrier 208 is disposed within the housing 102. The thermal barrier 208 includes a compartment 210 containing an insulating medium. The insulating medium is preferably a microporous insulation that has low thermal conductivity and occupies a much smaller compartment volume as compared to, for example, the ceramic fiber blanket described above in the background section. Accordingly, the outside envelope or footprint of the thermal protection system 100 can be reduced as compared to current thermal protection systems, which may be increasingly significant as the furnaces being used have restricted entrance and exit dimensions. As shown in FIGS. 3 and 4, the thermal barrier 208 is disposed around at least a part of the interior cavity 300 to help maintain a temperature of the interior cavity within a desired temperature range that does not present a danger to the equipment or other items placed within the interior cavity.

A pressure relief valve 212 is positioned at least partially within the housing 102. A small-diameter tube 214 connects one end of the pressure relief valve 212 to the compartment 210 of the thermal barrier 208. The other end of the pressure relief valve 212 is positioned within the access tube 114 that, in the embodiment shown, is open to an environment outside the compartment 210 and possibly the environment outside the housing 102. The pressure relief valve 212 is thus in fluid communication with the compartment 210 containing the insulating medium and allows excess pressure within the compartment 210 to escape the compartment 210 to an outer environment.

As will be appreciated from the description herein, the pressure relief valve 212 is configured to permit a fluid, such as air, within the compartment 210 to pass from the compartment 210 through the pressure relief valve 212 toward the environment outside of the compartment 210, and possibly outside of the housing 102, when a pressure of the fluid within the compartment 210 exceeds a predetermined amount of pressure. The predetermined amount of pressure may be determined by the construction of the pressure relief valve 212. The compartment 210 is sealed from the environment outside of the compartment 210 except for the fluid communication from the compartment 210 via the tube 214 and the pressure relief valve 212. Sealing of the compartment 210 may be obtained, for example, by welding any open edges of the compartment 210.

The pressure relief valve 212 may not be constructed to withstand the high temperatures of the furnace through which the thermal protection system 100 is intended to pass. Accordingly, embodiments of the thermal protection system 100 provide an arrangement in which the pressure relief valve 212 is coupled to a thermally-protected mounting 216 within the housing 102. The thermally-protected mounting 216 maintains a temperature of at least an operative portion of the pressure relief valve 212 within a desired temperature range that prevents the pressure relief valve 212 from being compromised by the high temperatures of the furnace.

FIG. 3 illustrates a cross-section view of the thermal protection system 100 along the line 3-3 shown in FIG. 1, while FIG. 4 illustrates a cross-section view of the thermal protection system 100 along the line 4-4 shown in FIG. 1. In some embodiments, the pressure relief valve 212 may be a one-way valve that permits the fluid, such as air, within the compartment 210 to flow in one direction, from the compartment 210 toward the outer environment via the access tube 114. The one-way valve may, for example, employ a spring and ball configuration in which a ball seals against an aperture until a fluid pressure on the opposite side of the ball is greater than the pressure exerted by the spring, at which point the ball is unseated from the aperture allowing the pressurized fluid to flow through the aperture until the fluid pressure is reduced and the spring again causes the ball to seal against the aperture. Other suitable one-way valves may be employed in embodiments of the thermal protection system 100.

The interior cavity 300 is sized to hold electronic equipment, such as a temperature data logging device. The electronic equipment may be configured to receive electrical signals from sensors, such as temperature sensors or other environmental sensors disposed outside of the housing 102, and store data derived from the electrical signals. As described earlier, the sensors may be connected by electrical wires to the electronic equipment in the interior cavity 300 in a sealed configuration.

In at least some embodiments, the thermal barrier 208 is spaced from the interior cavity 300, and a temperature-limiting fluid 302 is disposed in the space 304 between the thermal barrier 208 and the interior cavity 300. The temperature-limiting fluid 302 maintains the temperature of the interior cavity 300 within a desired temperature range.

The temperature-limiting fluid 302 may have a property in which the fluid changes phase within the desired temperature range of the interior cavity 300. For example, the temperature-limiting fluid may be water which has a boiling temperature of 100° C. at which point the water changes from a liquid phase to a gaseous or vapor phase. Preferably, when the temperature-limiting fluid 302 changes phase, at least a portion of the temperature-limiting fluid 302 that has changed phase is permitted to flow from the space 304 to maintain an acceptable fluid pressure within the space 304.

In the illustrated embodiment, the pressure relief valve 212 is disposed within a first end of an access tube 114 having a second end 306 that is open to the environment to allow fluid from the compartment 210 to flow through the tube 214 and the pressure relief valve 212 toward the environment. In some embodiments, the temperature-limiting fluid 302 that has changed phase flows through an opening 308 (see FIG. 5), such as a breather hole, into or adjacent the second end 306 of the access tube 114. In cases where the temperature-limiting fluid 302 is or includes water, steam from the boiling water is allowed to flow through the opening 308 into the second end 306 of the access tube 114. The steam that collects in the second end 306 of the access tube 114 provides an additional temperature barrier between the outer environment and the pressure relief valve 212, while at the same time allowing excess pressure to escape from the sealed insulating compartment 210.

As shown in FIGS. 3 and 4, the thermally-protected mounting 216 is thermally coupled to the temperature-limiting fluid 302 within the housing 102 such that the temperature-limiting fluid 302 helps maintain the temperature of the operative portion of the pressure relief valve 212 within a desired temperature range. The pressure relief valve 212 may be removably coupled to the thermally-protected mounting 216. For example, the pressure relief valve 212 may include outer threads that can be connected to inner threads (or vice versa) defined in the thermally-protected mounting 216. In this manner, the pressure relief valve 212 may be unscrewed from the thermally-protected mounting 216 for servicing and/or replacement. Preferably, the access tube 114 is sized to allow the pressure relief valve 212 to be removed and/or replaced via the access tube 114.

Further depicted in FIGS. 1 and 4 is a filler tube 116 that is in fluid communication with the interior space 304 in the interior of the housing 102. The filler tube 116 permits a temperature-limiting fluid 302 to flow into the interior space 304 of the housing 102 to maintain the temperature of the interior cavity 300 within the desired temperature range of the interior cavity 300. The temperature-limiting fluid, which may be water for example, may be added to the space 304 of the housing 102 via the filler tube 116 before the temperature protection system 100 passes though the furnace. Further, the water in the space 304 may be replenished by water used in the quenching process. A baffle 400 within the filler tube 116 limits or prevents the temperature-limiting fluid 302 in the interior space 304 of the housing 102 from spilling out of the space 304.

Because the interior cavity 300 is sealed from the interior space 304 of the housing 102, the temperature-limiting fluid 302 does not harm or otherwise compromise equipment that is arranged within the interior cavity 300. Also, as can be seen, the temperature-limiting fluid 302 substantially surrounds the thermally-protected mounting 216 to which the pressure relief valve 212 is coupled. In this manner, the temperature-limiting fluid 302 is able to control the temperature of the thermally-protected mounting 216 which in turn helps maintain the temperature of the pressure relief valve 212 within a desired temperature range.

In FIG. 4, the access door 106 is in an open position which allows access to the interior cavity 300 within the housing 102. As illustrated, the inner side of the access door 106 includes an attached door compartment 402 containing an insulating medium 404 that thermally protects the interior cavity 300 when the access door 106 is closed. The access door 106, as mentioned earlier, is further configured to allow electrical wires to pass from the interior cavity 300 in a sealed configuration to the environment outside the housing 102.

Figure 5:
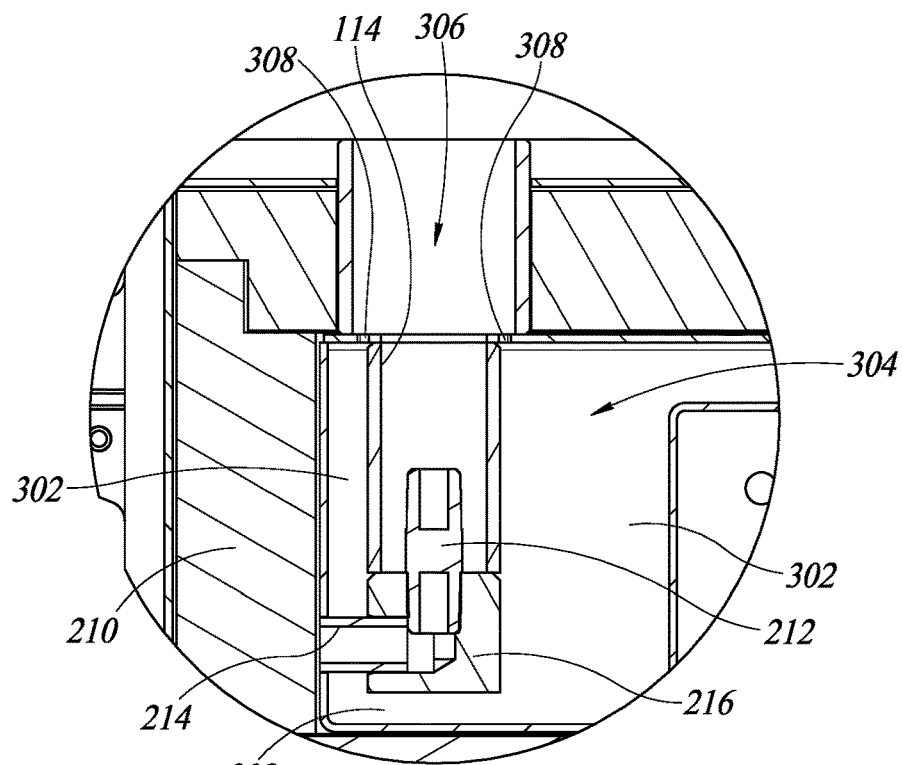
FIG. 5 illustrates a further detailed cross-section view of aspects of the thermal protection system according to the present disclosure.
Figure 6:
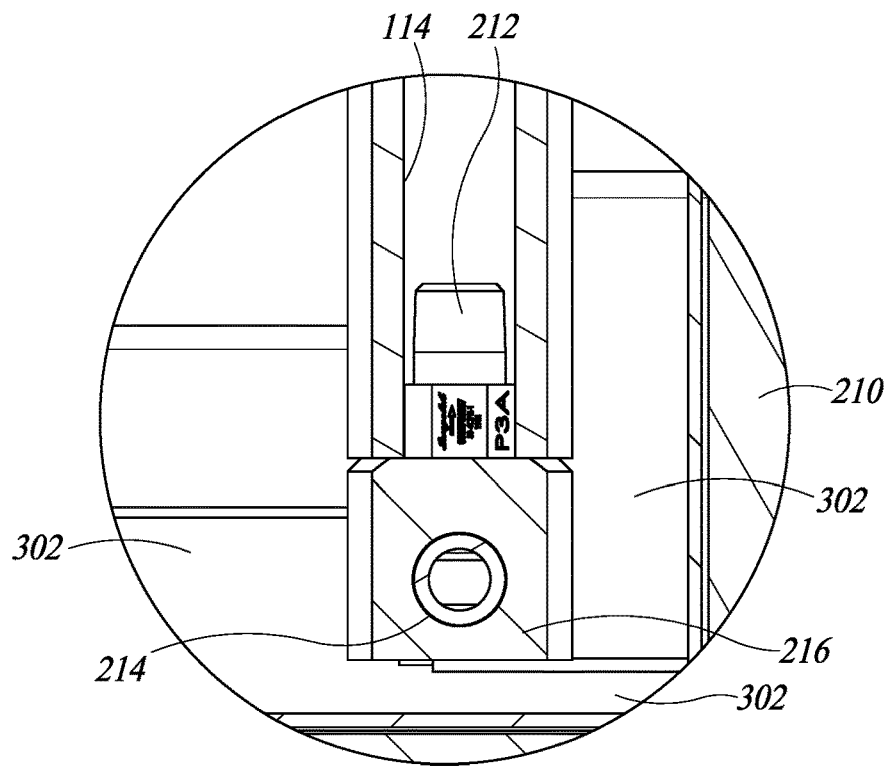
FIG. 6 illustrates a further detailed cross-section view of the thermal protection system along a line 6-6 shown in FIG. 3.

FIGS. 5 and 6 illustrate further detailed views of the pressure relief valve 212 coupled to the thermally-protected mounting 216. The thermally-protected mounting 216, which may be a metal (e.g., steel) block having high temperature conductivity, is arranged within the access tube 114 and is thermally coupled to the temperature-limiting fluid 302 that surrounds the thermally-protected mounting 216. Openings 308 permit temperature-limiting fluid 302 that has changed phase (e.g., changed from liquid to gas, e.g., steam) to pass into the second end 306 of the access tube 114. The steam provides an additional temperature barrier to protect the pressure relief valve 212 from the high temperatures of the furnace while at the same time the pressure relief valve 212 prevents excess pressure from building up within the interior space 304 of the housing 102.

Figure 7:
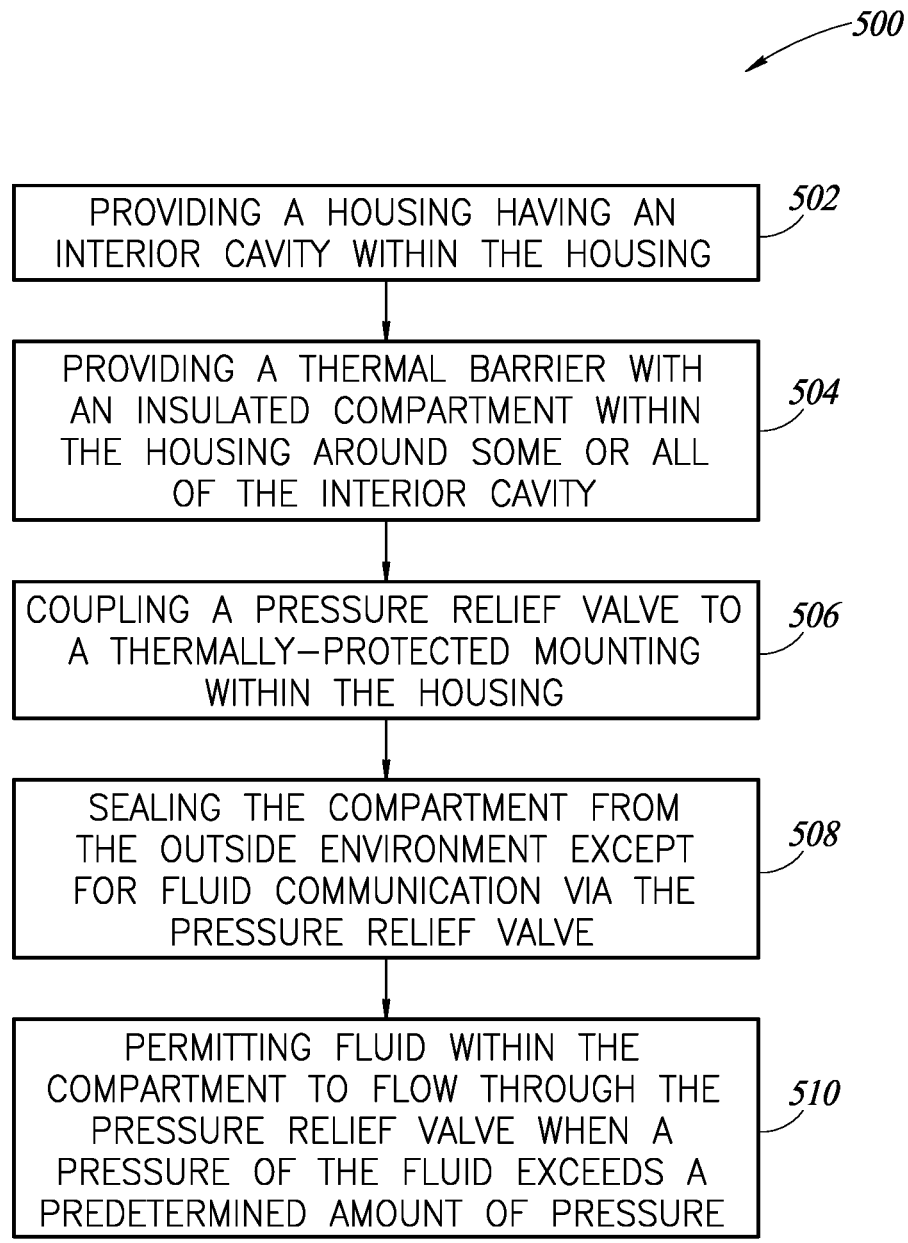
FIG. 7 is a flowchart illustrating a method for providing thermal protection according to the present disclosure.

The present disclosure further provides methods for providing thermal protection to equipment intended to pass through the high temperatures of a furnace and possibly quenching, as described above. At least one method 500 of the disclosure, as illustrated in FIG. 7, includes providing a housing 502 having an interior cavity, and further providing a thermal barrier 504 within the housing. The thermal barrier includes a compartment containing an insulating medium. The compartment containing the insulating medium is disposed around at least a part of the interior cavity of the housing to maintain a temperature of the interior cavity within a first temperature range.

The method 500 also includes coupling a pressure relief valve 506 to a thermally-protected mounting within the housing so as to maintain a temperature of an operative portion of the pressure relief valve within a second temperature range. The first and second temperature ranges in this regard may be the same or may be different temperature ranges. In any event, the pressure relief valve is in fluid communication with the compartment of the thermal barrier containing the insulating medium and allows fluid, such as air, under excess pressure in the compartment to escape the compartment to an outer environment. As described earlier, the compartment is sealed 508 from the environment outside of the compartment except for fluid communication from the compartment via the pressure relief valve. When the pressure of the fluid within the compartment exceeds a predetermined amount of pressure, the method 500 includes permitting the fluid within the compartment to flow 510 through the pressure relief valve toward the environment outside of the compartment and possibly outside of the housing.

Embodiments of the method may further comprise arranging electronic equipment within the interior cavity and coupling wires from the electronic equipment to sensors that are disposed outside of the housing. The electronic equipment may be configured to receive electrical signals from the sensors and store data derived from the electrical signals while being protected from high temperatures in the environment, as described above.

Embodiments of the method may further comprise filling an interior of the housing between the thermal barrier and the interior cavity with a temperature-limiting fluid that maintains the temperature of the interior cavity within the first temperature range. The thermally-protected mounting to which the pressure relief valve is coupled may be arranged within the housing such that the temperature-limiting fluid in the interior of the housing substantially surrounds the thermally-protected mounting and maintains the temperature of the operative portion of the pressure relief valve within the second temperature range.

Embodiments of the method may also comprise arranging the pressure relief valve within an access tube having an end that is open to the environment to allow fluid from the compartment containing the insulating medium to flow through the pressure relief valve toward the environment. One or more openings or breather holes are defined above and/or adjacent to the pressure relief valve where the phase-changed fluid (e.g., steam) can exit the interior of the housing. When the temperature-limiting fluid in the interior of the housing has changed phase, the phase-changed fluid may be allowed to flow through an opening into or adjacent the end of the access tube that is open to the environment. This creates a secondary defense adding further temperature protection to the pressure relief valve. Thus for example, when the temperature-limiting fluid is water, the interior cavity as well as the temperature-protected mounting are maintained at a maximum 100° C. (the boiling point of the water), keeping the temperature of the pressure relief valve below its maximum operating temperature and maintaining its ability to operate reliably.

A small diameter tube feeds directly from the insulated compartment into the base of the pressure relief valve, releasing trapped air and reducing expansion stresses introduced in the insulated compartment during the heating and quenching cycles. In various embodiments as noted above, the pressure relief valve may be a one-way check valve that enables expanded air to escape the insulated compartment, but prevents water from the quenching process from entering the insulated compartment.

It should be understood that the various embodiments described above can be combined to provide yet further embodiments. Furthermore, aspects of the embodiments disclosed herein can be modified.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A thermal protection system, comprising:
a housing;
an interior cavity within the housing;
a thermal barrier within the housing, wherein the thermal barrier includes a compartment containing an insulating medium, and the thermal barrier is disposed around at least a part of the interior cavity to maintain a temperature of the interior cavity within a first temperature range; and
a pressure relief valve at least partially within the housing, wherein the pressure relief valve is in fluid communication with the compartment of the thermal barrier containing the insulating medium, and the pressure relief valve is configured to permit a fluid within the compartment to pass from the compartment through the pressure relief valve toward an environment outside of the compartment when a pressure of the fluid within the compartment exceeds a predetermined amount of pressure,
wherein the compartment is sealed from the environment outside of the compartment except for fluid communication from the compartment via the pressure relief valve, and
wherein the pressure relief valve is coupled to a thermally-protected mounting within the housing that maintains a temperature of an operative portion of the pressure relief valve within a second temperature range.

2. The thermal protection system of claim 1, wherein the fluid within the compartment is air.

3. The thermal protection system of claim 1, wherein the pressure relief valve is a one-way valve that permits the fluid within the compartment to flow in one direction from the compartment toward the environment.

4. The thermal protection system of claim 1, wherein the interior cavity is sized to hold electronic equipment that is configured to receive electrical signals from sensors disposed outside of the housing and store data derived from the electrical signals.

5. The thermal protection system of claim 1, wherein the thermal barrier is spaced from the interior cavity, and a temperature-limiting fluid is disposed in a space between the thermal barrier and the interior cavity to maintain the temperature of the interior cavity within the first temperature range.

6. The thermal protection system of claim 5, wherein the temperature-limiting fluid changes phase within the first temperature range, and when the temperature-limiting fluid changes phase, at least a portion of the temperature-limiting fluid that has changed phase is permitted to flow from the space between the thermal barrier and the interior cavity.

7. The thermal protection system of claim 6, wherein the pressure relief valve is disposed within an access tube having an end that is open to the environment to allow fluid from the compartment passing through the pressure relief valve to flow toward the environment, and wherein an opening into or adjacent to the end of the access tube is configured to allow the temperature-limiting fluid that has changed phase to pass through the opening to the environment.

8. The thermal protection system of claim 5, wherein the temperature-limiting fluid includes water.

9. The thermal protection system of claim 5, wherein the thermally-protected mounting is thermally coupled to the temperature-limiting fluid within the housing, the temperature-limiting fluid maintaining the temperature of the operative portion of the pressure relief valve within the second temperature range.

10. The thermal protection system of claim 1, further comprising an access tube, wherein the pressure relief valve is disposed within the access tube at a first end of the access tube, and a second end of the access tube is open to the environment to allow fluid from the compartment passing through the pressure relief valve to flow toward the environment.

11. The thermal protection system of claim 10, wherein the pressure relief valve is removably coupled to the thermally-protected mounting, and the access tube is sized to allow the pressure relief valve to be removed via the access tube.

12. The thermal protection system of claim 1, further comprising a filler tube in fluid communication with an interior of the housing, wherein the interior cavity is sealed from the interior of the housing, and wherein the filler tube permits a temperature-limiting fluid to flow into the interior of the housing to maintain the temperature of the interior cavity within the first temperature range.

13. The thermal protection system of claim 12, further comprising a baffle within the filler tube, wherein the baffle limits the temperature-limiting fluid in the interior of the housing from flowing out of the interior of the housing.

14. The thermal protection system of claim 12, wherein the temperature-limiting fluid in the interior of the housing substantially surrounds the thermally-protected mounting to which the pressure relief valve is coupled.

15. The thermal protection system of claim 1, further comprising an access door that, in an open position, allows access to the interior cavity within the housing, wherein an inner side of the access door includes a door compartment with an insulating medium that thermally protects the interior cavity when the access door is a closed position, the access door being further configured to allow electrical wires in a sealed configuration to pass from the interior cavity to an environment outside the housing.

16. A method for providing thermal protection, comprising:
   providing a housing having an interior cavity within the housing;
   providing a thermal barrier within the housing, wherein the thermal barrier includes a compartment containing an insulating medium and is disposed around at least a part of the interior cavity to maintain a temperature of the interior cavity within a first temperature range;
   coupling a pressure relief valve to a thermally-protected mounting within the housing that maintains a temperature of an operative portion of the pressure relief valve within a second temperature range, wherein the pressure relief valve is in fluid communication with the compartment of the thermal barrier containing the insulating medium;
   sealing the compartment from an environment outside of the compartment except for fluid communication from the compartment via the pressure relief valve, and when a pressure of the fluid within the compartment exceeds a predetermined amount of pressure, permitting the fluid within the compartment to flow from the compartment through the pressure relief valve toward the environment outside of the compartment.

17. The method of claim 16, further comprising arranging electronic equipment within the interior cavity and coupling wires from the electronic equipment to sensors disposed outside of the housing, wherein the electronic equipment is configured to receive electrical signals from the sensors and store data derived from the electrical signals while being temperature protected from an environment outside of the housing.

18. The method of claim 16, further comprising filling an interior of the housing between the thermal barrier and the interior cavity with a temperature-limiting fluid to maintain the temperature of the interior cavity within the first temperature range.

19. The method of claim 18, further comprising arranging the temperature-limiting fluid to substantially surround the thermally-protected mounting to maintain the temperature of the operative portion of the pressure relief valve within the second temperature range.

20. The method of claim 18, further comprising arranging the pressure relief valve within an access tube having an end that is open to the environment to allow fluid from the compartment flowing through the pressure relief valve to flow toward the environment, wherein temperature-limiting fluid in the interior of the housing that has changed phase flows through an opening into or adjacent the end of the access tube that is open to the environment.

* * * * *